(12) United States Patent
Brugman et al.

(10) Patent No.: US 11,169,795 B2
(45) Date of Patent: *Nov. 9, 2021

(54) MANAGEMENT OF TRANSPORT SOFTWARE UPDATES

(71) Applicant: TOYOTA MOTOR NORTH AMERICA, INC., Plano, TX (US)

(72) Inventors: Louis Brugman, Frisco, TX (US); Devang H. Parekh, Dallas, TX (US); Wilson-Boon Siang Khoo, Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,770

(22) Filed: Oct. 9, 2019

(65) Prior Publication Data

US 2021/0109733 A1    Apr. 15, 2021

(51) Int. Cl.
*G06F 8/65* (2018.01)
*G06F 9/445* (2018.01)
*H04L 29/08* (2006.01)
*G06F 8/70* (2018.01)

(52) U.S. Cl.
CPC .............. *G06F 8/65* (2013.01); *G06F 8/70* (2013.01); *G06F 9/44589* (2013.01); *H04L 67/12* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 7,222,187 B2 | 5/2007 | Yeager et al. |
| 7,360,208 B2 | 4/2008 | Joshi et al. |
| 7,555,551 B1 | 6/2009 | McCorkendale et al. |
| 7,584,470 B2 | 9/2009 | Barker et al. |
| 7,886,200 B1 | 2/2011 | Hernacki et al. |
| 8,285,883 B2 | 10/2012 | Bishop |
| 8,751,100 B2 | 6/2014 | Johnson et al. |
| 9,083,425 B1 | 7/2015 | Frolov et al. |

(Continued)

FOREIGN PATENT DOCUMENTS

| | | |
|---|---|---|
| CA | 2823070 C | 5/2016 |
| CN | 105718293 A | 6/2016 |

(Continued)

OTHER PUBLICATIONS

Jankowski, "Strategic distribution of seeds to support diffusion in complex network", 2018, Published at https://journals.plos.org/plosone/article?id=10.1371/journal.pone.0205130 (Year: 2018).*

(Continued)

*Primary Examiner* — Hossain M Morshed

(57) ABSTRACT

An example operation may include one or more of receiving a software update at a transport of a subset of transports, validating the software update based on one or more of: a period of time when the software update is in use, and a number of utilizations of the software update by the subset of the transports, propagating the software update based on the validating, to a further subset of transports, wherein the further subset of the transports is larger than the subset of the transports.

20 Claims, 18 Drawing Sheets

(56) References Cited

U.S. PATENT DOCUMENTS

| | | | |
|---|---|---|---|
| 9,443,358 B2 | 9/2016 | Breed | |
| 9,715,378 B2* | 7/2017 | Dickerson | G06F 8/65 |
| 9,753,713 B2 | 9/2017 | Mani et al. | |
| 9,985,718 B2 | 5/2018 | Frolov et al. | |
| 10,031,790 B1 | 7/2018 | Uchs et al. | |
| 10,050,760 B2 | 8/2018 | Ross et al. | |
| 10,157,050 B2 | 12/2018 | Kotani et al. | |
| 10,240,935 B2 | 3/2019 | Breed | |
| 10,261,777 B2 | 4/2019 | Fox | |
| 10,339,034 B2 | 7/2019 | Armitage | |
| 10,373,129 B1 | 8/2019 | James et al. | |
| 10,447,483 B1* | 10/2019 | Su | H04L 9/0643 |
| 10,666,767 B1 | 5/2020 | Floyd et al. | |
| 2005/0050538 A1 | 3/2005 | Kawamata et al. | |
| 2006/0106806 A1* | 5/2006 | Sperling | G06F 21/57 |
| 2009/0100128 A1* | 4/2009 | Czechowski, III | H04L 67/1076 709/203 |
| 2009/0119657 A1 | 5/2009 | Link | |
| 2013/0139140 A1* | 5/2013 | Rao | G06F 8/65 717/170 |
| 2014/0176301 A1 | 6/2014 | Banares et al. | |
| 2014/0306834 A1 | 10/2014 | Ricci | |
| 2016/0013934 A1* | 1/2016 | Smereka | H04L 9/32 713/171 |
| 2016/0259637 A1 | 9/2016 | Kumar | |
| 2016/0294614 A1* | 10/2016 | Searle | H04L 67/34 |
| 2017/0060559 A1* | 3/2017 | Ye | H04L 63/061 |
| 2017/0075677 A1 | 3/2017 | Gross et al. | |
| 2018/0018723 A1 | 1/2018 | Nagla et al. | |
| 2018/0052681 A1* | 2/2018 | Pereira Cabral | H04W 48/20 |
| 2018/0099564 A1 | 4/2018 | Koebler et al. | |
| 2018/0285088 A1 | 10/2018 | Lancioni et al. | |
| 2018/0341571 A1* | 11/2018 | Kislovskiy | G06F 8/65 |
| 2018/0365131 A1 | 12/2018 | Armitage | |
| 2019/0265965 A1* | 8/2019 | Acharya | H04L 63/0823 |
| 2020/0029209 A1 | 1/2020 | Nölscher et al. | |
| 2020/0042012 A1 | 2/2020 | Zander | |
| 2020/0068365 A1* | 2/2020 | Esselink | H04L 67/12 |
| 2020/0073651 A1 | 3/2020 | Bravo et al. | |
| 2020/0081699 A1 | 3/2020 | Majed et al. | |
| 2020/0151817 A1 | 5/2020 | Mahfouz | |

FOREIGN PATENT DOCUMENTS

| | | |
|---|---|---|
| DE | 102005021103 A1 | 12/2005 |
| DE | 112012007197 | 8/2015 |
| DE | 102017217668 A1 | 4/2019 |
| EP | 2863303 A1 | 4/2015 |
| EP | 2425333 B1 | 8/2017 |
| JP | 2012133789 A | 7/2012 |
| KR | 20130086363 A | 8/2013 |
| WO | 2012021903 A1 | 2/2012 |
| WO | 2014088567 A1 | 6/2014 |
| WO | 2019021064 A1 | 1/2019 |

OTHER PUBLICATIONS

FDA, "General Principles of Software Validation; Final Guidance for Industry and FDA Staff", 2002, Published by FDA (Year: 2002).*

Baza, "Blockchain-based Firmware Update Scheme Tailored for Autonomous Vehicles", 2018, Proc. of the IEEE Wireless Communications and Networking Conference (WCNC), Apr. 2019 (Year: 2018).*

Jankowski, "Strategic distribution of seeds to support diffusion in complex networks", 2018, PLoS One (Year: 2018).*

Baza, "Blockchain-based Firmware Update Scheme Tailored for Autonomous Vehicles", 2019, IEEE (Year: 2019).*

Simoni, "RankSlicing: A decentralized protocol for supernode selection", 2014, IEEE (Year: 2014).*

Baza et al.; "Blockchain-Based Firmware Update Scheme Tailored for Autonomous Vehicles." 2019 IEEE Wireless Communications and Networking Conference (WCNC); Apr. 15, 2019 (Year: 2019).

Christidis et al.; "Blockchains and Smart Contracts for the Internet of Things"; IEEE Access; 2016 (Year: 2016).

Cindy Sridharan; "Testing in Production, the Safe Way"; Medium. com website [full url in ref.]; Mar. 25, 2018 (Year: 2018).

Dorri et al.; "BlockChain: A Distributed Solution to Automotive Security and Privacy"; IEEE Communications Magazine (v. 55, No. 12 ) (pp. 119-125); Dec. 2017 (Year: 2017).

Lee, J.; "Patch Transporter: Incentivized, Decentralized Software Patch System for WSN and IoT Environments"; Sensors (Basel); Feb. 13, 2018 (Year: 2018).

Feng et al.; "An Augmented Reality Environment for Connected and Automated Vehicle Testing and Evaluation"; 2018 IEEE Intelligent Vehicles Symposium (pp. 1549-1554); Jun. 26-30, 2018 (Year: 2018).

* cited by examiner

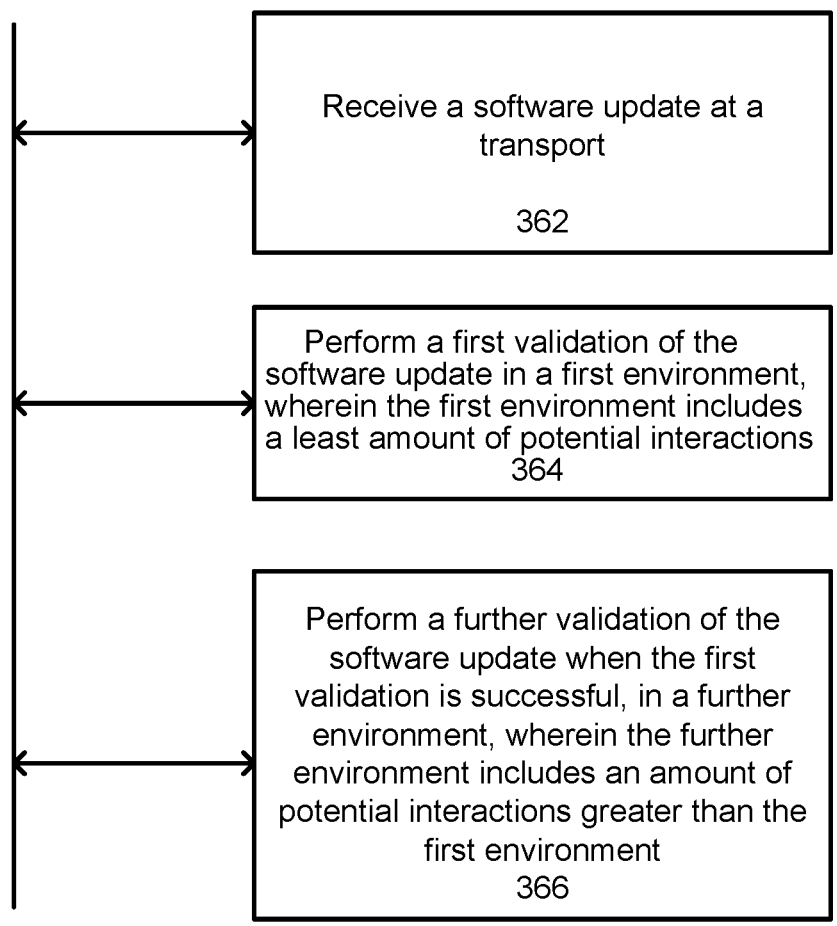

MANAGEMENT OF TRANSPORT SOFTWARE UPDATES

TECHNICAL FIELD

This application generally relates to software updates of transports, and more particularly, to management of transport software updates.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer, or a tablet.

Software updates for the transports are generally carried out from a central server that serves the software update(s) to each individual transport client computer. This generally requires a network connection to the cloud. However, extensive use of a WAN to distribute software updates is inefficient and may not be secure. Additionally, the software update may not be adequately tested by a sufficiently large number of transports prior to being sent by the server. A centralized system that can collect and securely and efficiently track the software updates-related information from millions of transports does not exist.

Accordingly, it is desired to have secured propagation of transport software updates based on extensive testing by a large number of transports. It is also desired to have software updates-related information recorded on a shared storage.

SUMMARY

One example embodiment may provide a method that includes one or more of receiving a software update at a transport of a subset of transports; validating the software update based on one or more of: a period of time when the software update is in use, and a number of utilizations of the software update by the subset of the transports; propagating the software update based on the validating, to a further subset of transports, wherein the further subset of the transports is larger than the subset of the transports.

Another example embodiment may provide a method that includes one or more of sending, by a master transport, a first portion of a software update to a transport of a first subset of transports, sending, by a master transport, a second portion of the software update to a transport of a further subset of transports, when a first transport of the subset of the transports and a second transport of the further subset of the transports are in proximity: causing the first transport to send the first portion of the software update to the second transport, and causing the second transport to send the second portion of the software update to the first transport.

Yet another example embodiment may provide a method that includes one or more of receiving a software update at a transport, performing a first validation of the software update in a first environment, wherein the first environment includes a least amount of potential interactions, and performing a further validation of the software update when the first validation is successful, in a further environment, wherein the further environment includes an amount of potential interactions greater than the first environment.

Another example embodiment may provide a system that includes a processor and memory, wherein the processor of a transport of subset of transports is configured to perform one or more of receive a software update; validate the software update based on one or more of: a period of time when the software update is in use, and a number of utilizations of the software update by the subset of the transports; propagate the software update based on the validating, to a further subset of transports, wherein the further subset of the transports is larger than the subset of the transports.

Another example embodiment may provide a system that includes a processor and memory, wherein the processor of a master transport is configured to perform one or more of send a first portion of a software update to a transport of a first subset of transports, send a second portion of the software update to a transport of a further subset of transports, when a first transport of the subset of the transports and a second transport of the further subset of the transports are in proximity: cause the first transport to send the first portion of the software update to the second transport, and cause the second transport to send the second portion of the software update to the first transport.

Yet another example embodiment may provide a system that includes a processor and memory, wherein the processor is configured to perform one or more of receive a software update at a transport, perform a first validation of the software update in a first environment, wherein the first environment includes a least amount of potential interactions, and perform a further validation of the software update when the first validation is successful, in a further environment, wherein the further environment includes an amount of potential interactions greater than the first environment.

A further example embodiment provides a non-transitory computer readable medium comprising instructions, that when read by a processor of a transport of a subset of transports, cause the processor to perform one or more of receiving a software update, validating the software update based on one or more of: a period of time when the software update is in use, and a number of utilizations of the software update by the subset of the transports; propagating the software update based on the validating, to a further subset of transports, wherein the further subset of the transports is larger than the subset of the transports.

A further example embodiment provides a non-transitory computer readable medium comprising instructions, that when read by a processor, cause the processor to perform one or more of sending a first portion of a software update to a transport of a first subset of transports, sending a second portion of the software update to a transport of a further subset of transports, when a first transport of the subset of the transports and a second transport of the further subset of the transports are in proximity: causing the first transport to send the first portion of the software update to the second transport, and causing the second transport to send the second portion of the software update to the first transport.

Yet a further example embodiment provides a non-transitory computer readable medium comprising instructions, that when read by a processor, cause the processor to perform one or more of receiving a software update, performing a first validation of the software update in a first environment, wherein the first environment includes a least amount of potential interactions, and performing a further validation of the software update when the first validation is successful, in a further environment, wherein the further environment includes an amount of potential interactions greater than the first environment.

BRIEF DESCRIPTION OF THE DRAWINGS

FIG. 3E illustrates a further flow diagram, according to example embodiments.

DETAILED DESCRIPTION

Figure 1A:
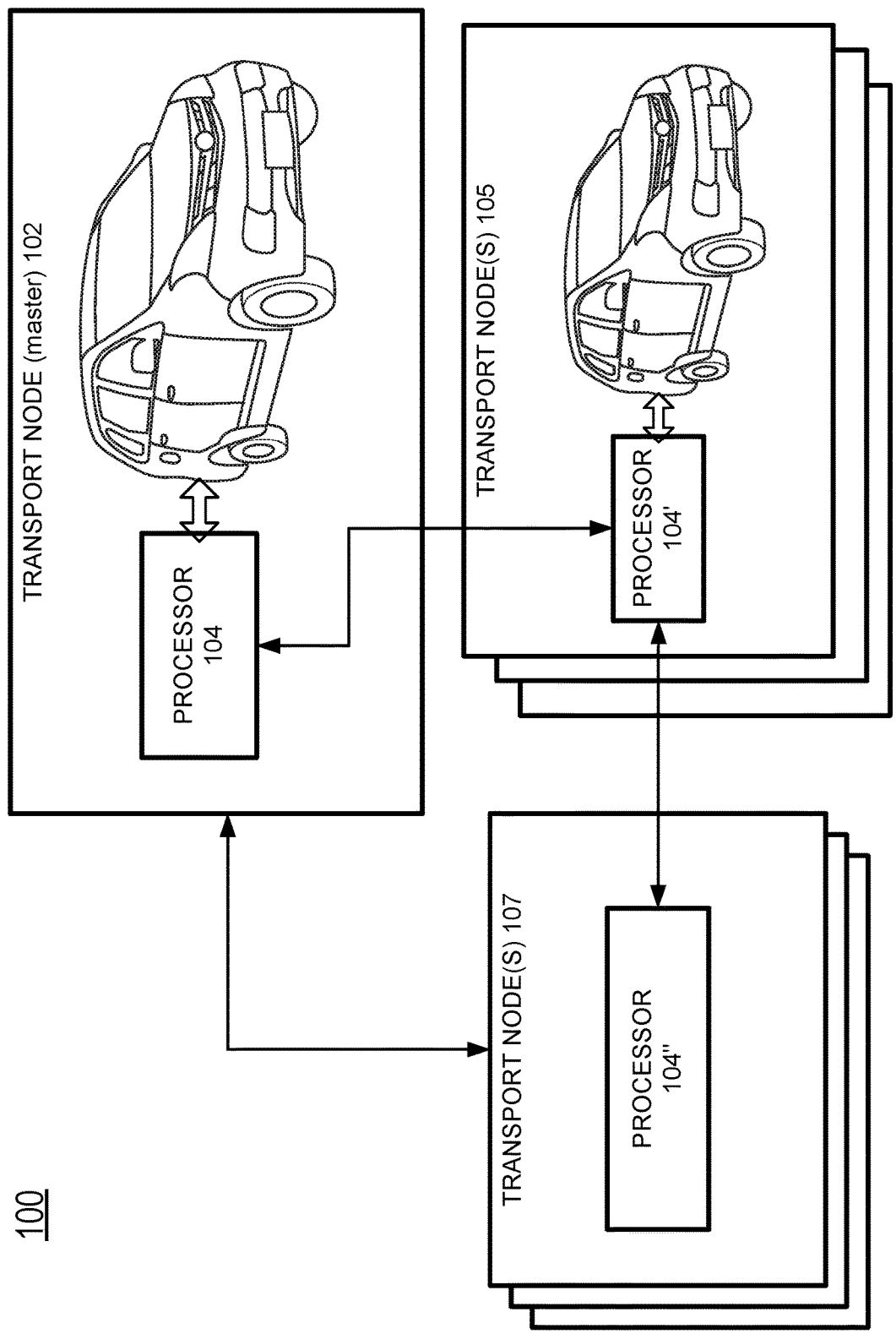
FIG. 1A illustrates a transport(s) network diagram in accordance to the example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve crypto-currencies and use consensus based on various protocols such as proof of work (PoW). On the other hand, a permissioned blockchain database provides a system, which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries, which are not endorsed, are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in an autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator, and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

According to the exemplary embodiments, propagation of a software update to vehicles without the use of WAN technology is provided. One exemplary embodiment allows for the software update to be propagated only after a test is performed by a first set of transports. The test can be performed over a period of time or over a number of executions of the software update code. When a test of the software fails, the transports are alerted, and the software on the transports may be reverted back to a previous software version.

In another embodiment, a master transport system may allow for additional security when propagating software updates to vehicles by dividing the software update into at least two portions and by sending the software update portions at different times and/or from different sources. In one exemplary embodiment, the software update may be first sent from a master transport. The exemplary embodiment may provide for a decentralized propagation of the software updates with authentication of the update via a blockchain technology.

According to the exemplary embodiments, a master transport may determine what portion of the software update to give to what transport based on the characteristic of the transport (e.g., security level of the transport, age of the transport, hardware in the transport capable of properly executing the software, condition of the transport, characteristics of user/occupants of the transport, use of features in or related to the transport). The update may be provided based on the probable usage of the update, e.g. which transport is able to better test/utilize the software update. In one example, a vehicle 1 may get a first portion of the update (ABC) and a vehicle 2 may get another portion of the update (ABC') from the same master transport. The software update may be divided into more than 2 portions—e.g., some transports may receive 2 portions, some 3 portions, and some—n portions. The master transport may have a level of security that is greater than the subset of transports and the further subset of transports. Any issues with the software update may be reported back the master transport (which can report it back to a central server). When an issue arises with any portion or with the assembled first and second portion of the update, the master transport can be moved into a proximity to the troubled transport and may monitor the transport to determine and solve the issue.

In yet another exemplary embodiment, once the software update(s) is received, assembled, and executed, the transport continues to run the old software version and intermittently use the new updated software in the least potentially problematic situations. For example, if the update is made to a braking software update, the transport may use the updated software when there is minimal traffic in the driving environment (and no pedestrians and/or objects are present). Once the updated software is validated in this driving environment, the transport may use the updated software in a different potentially problematic driving environment (e.g., more traffic, pedestrians, and/or objects). According to the exemplary embodiment, a driver of the transport may not be aware of the functionality of the software update management application. The transport's system may incrementally test tests the software update(s) in different environments and may revert to the previous version of the software if needed.

In yet another embodiment, the master transport determines what portion to give to what transport based on the characteristic of the transport (e.g. security level of the transport, age of the transport, hardware in the transport capable of properly executing the software, condition of the transport, characteristics of user/occupants of the transport, use of features in or related to the transport). The update may be based on the probable usage of the update, e.g. which transport is able to better test/utilize the software.

In yet a further embodiment, different vehicles may assemble the portions of the software based on time or day submitted, characteristics of the vehicle and/or software and/or user. For example, vehicle 1 can get first portion (ABC), very next transmission to vehicle 2 can get a first portion (ABC') from same master transport (i.e. the first portion may be different).

In yet a further embodiment, the software update can be divided into more than 2 portions. Some transports could receive 2 portions, some 3, some n.

In yet a further embodiment, the master transport comprises one or more of a level of security greater than the subset of transports and the further subset of transports, the first portion of the software update and the second portion of the software update.

In yet a further embodiment, any issues with the software is reported back the master transport (which can be reported back to a central server).

In yet a further embodiment, when an issue arises with any portion of the update, or with the assembled first and second portion, the master transport can be in proximity to the troubled transport and monitor and access the issue.

FIG. 1A illustrates a transport(s) network diagram 100 in accordance to the exemplary embodiments. According to one exemplary embodiment, the processor 104' of a transport of subset of transports (e.g., 105) may be configured to receive a software update. The software update may be provided by a master transport node (e.g., 102). The processor 104' may validate the software update based on a period of time when the software update is in use by the transports (e.g., 105). In one example, the processor 104' may validate the software update based on and a number of utilizations of the software update by the subset of the transports (e.g., 105). The processor 104' may propagate the software update based on the validating, to a further subset of transports (e.g., 107). The subset of the transports 107 is larger than the subset of the transports 105.

According to another exemplary embodiment, the processor 104 of a master transport 102 may be configured to send a first portion of a software update to a transport of a first subset of transports 105. The processor 104 of the master transport 102 may send a second portion of the software update to a transport of a further subset of transports 107. Then, when a first transport of the subset of the transports 105 and a second transport of the further subset of the transports 107 are in proximity, the processor 104 may send a command to the first transport 105 to send the first portion of the software update to the second transport 107. Then, the processor 104 may send a command to the second transport to send the second portion of the software update to the first transport 105. Thus, the processors 104' and 104" of the respective transports 105 and 107 may assemble a complete software update.

According to yet another exemplary embodiment, the processor 104' (or 104") may be configured to receive a software update (e.g., from the master transport node 102) and to perform a first validation of the software update in a first environment. The first environment may include a least amount of potential interactions (minimum traffic, no pedestrians, normal weather conditions, etc.). Then, the processor 104' (or 104") may perform a further validation of the software update when the first validation is successful in a further environment. The further environment may include an amount of potential interactions greater than the first environment (e.g., more traffic, pedestrians, difficult weather conditions, etc.).

Figure 1B:
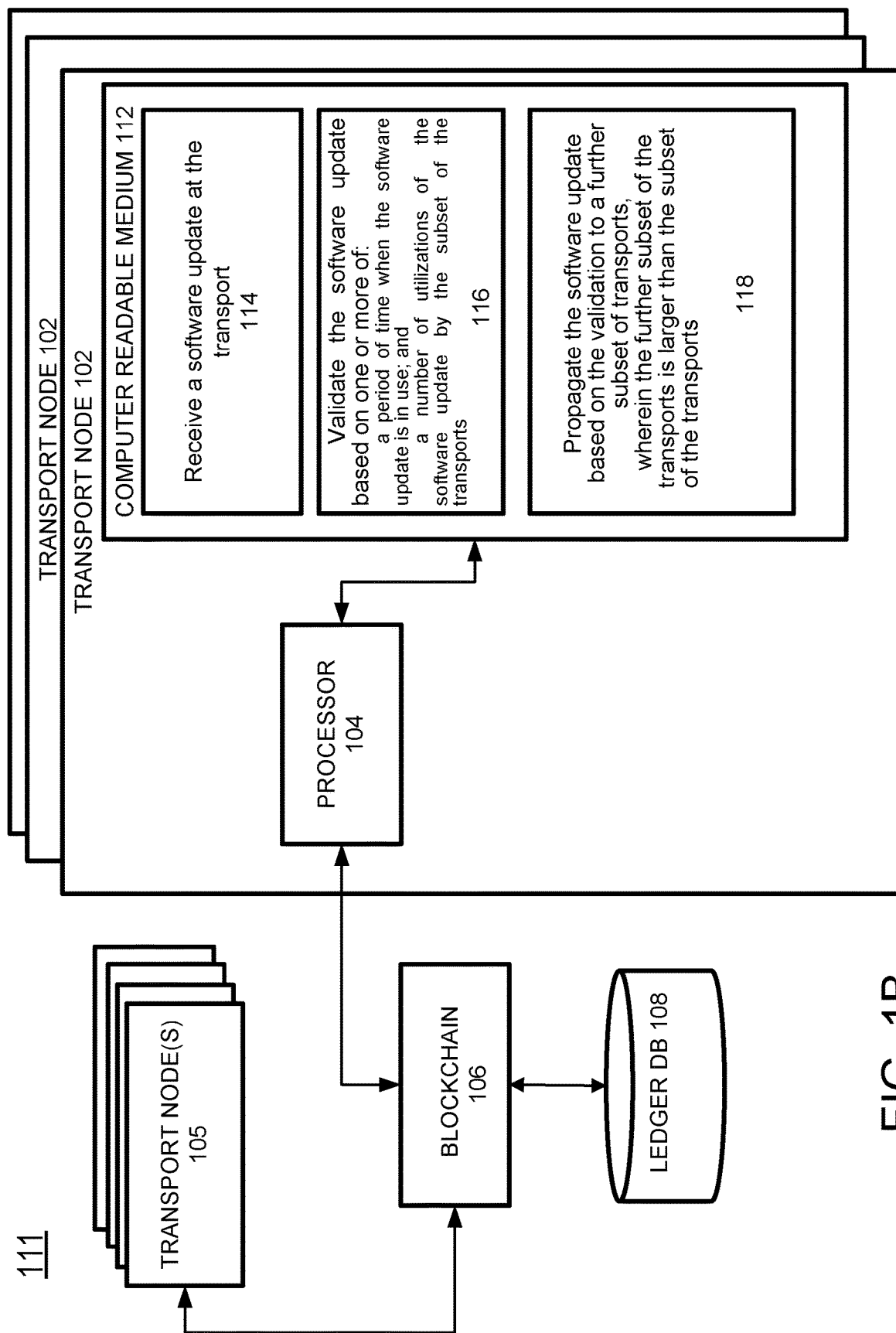
FIG. 1B illustrates an example network diagram including a transport node, according to example embodiments.

FIG. 1B illustrates a network diagram for management of software updates. Referring to FIG. 1B, the network diagram 111 includes a subset of transport nodes 102 connected to another subset of transport nodes 105 over a blockchain network 106. The transport nodes 102 and 105 may represent transports/vehicles. The blockchain network 106 may have ledger 108 for storing data, such as software update(s)-related data that includes timestamps of the software updates. The transport node 102 may be connected to other subsets of the transport nodes (not shown).

While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102 system.

The transport node 102 may also include a non-transitory computer readable medium 112 that may have stored thereon machine-readable instructions executable by the processor 104. Examples of the machine-readable instructions are shown as 114-118 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute the machine-readable instructions 114 to receive a software update at the transport 104. Each of the transports 102 and 105 may serve as a network peers (i.e., nodes) on a blockchain 106. As discussed above, the blockchain ledger 108 may store software updates-related transactions. The blockchain 106 network may be configured to use one or more smart contracts located on the transports (i.e., nodes) 102 that may manage transactions for other participating transport nodes 105. The transport node 102 may provide the information to the blockchain 106 to be stored on the ledger 108.

The processor 104 may execute the machine-readable instructions 116 to validate the software update. The software update may be validated based on a period of time when the software update is in use and on a number of utilizations of the software update by the subset of the transports 102. The processor 104 may execute the machine-readable instructions 118 to propagate the software update based on the validation to a further subset of transports (e.g., 105). The further subset of the transports 105 is larger than the subset of the transports 102.

Figure 1C:
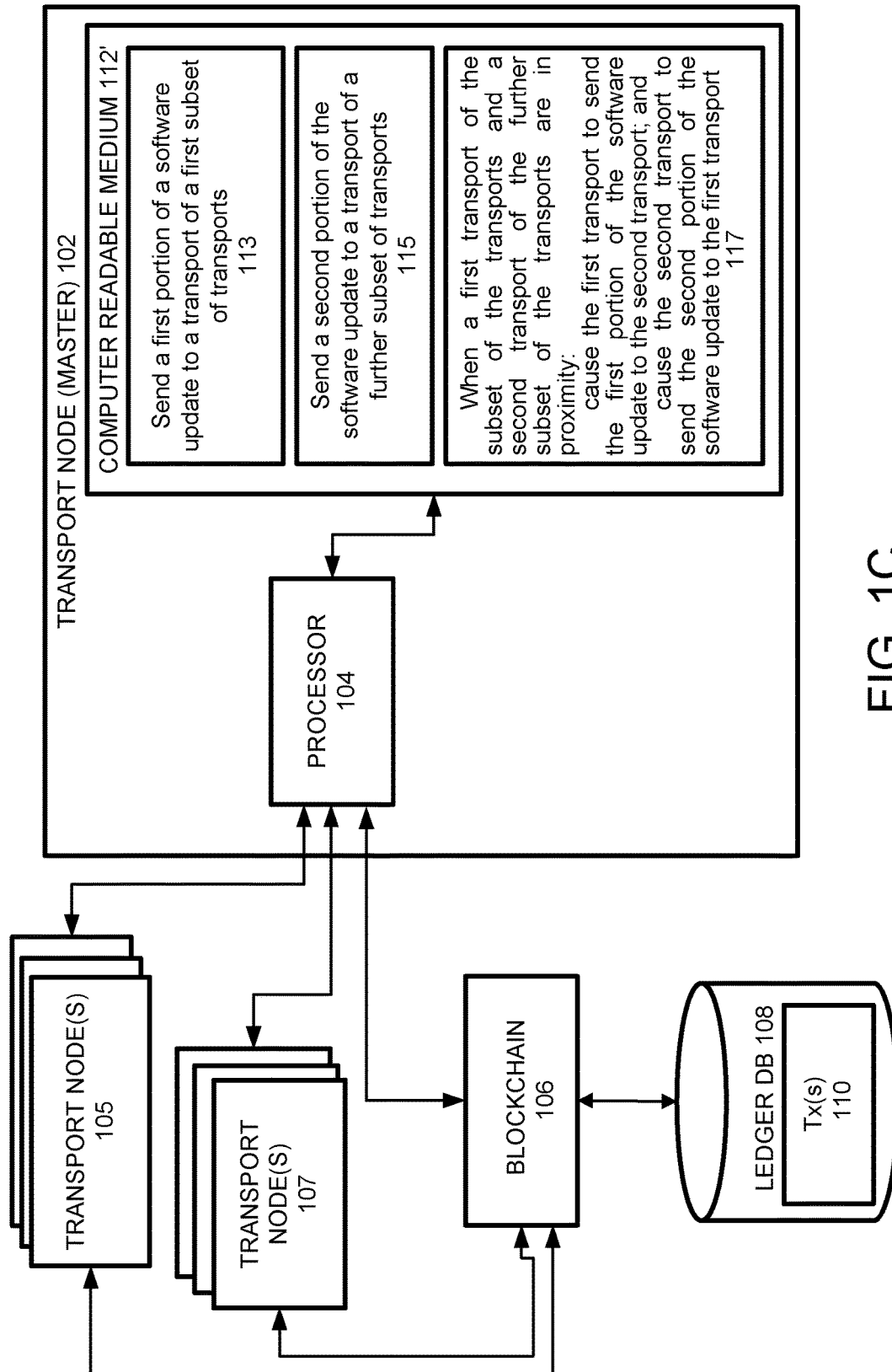
FIG. 1C illustrates another example network diagram including a transport node, according to example embodiments.

FIG. 1C illustrates a network diagram for management of transport software updates. Referring to FIG. 1C, the network diagram 121 includes a transport node 102 that serves as a master transport node connected to other transport nodes 105 and 107 over a blockchain network 106 that has a ledger 108 for storing software update-related transactions 110. The transport nodes 102, 105 and 107 may also serve as blockchain 106 peers. While this example describes in detail only one master transport node 102, multiple such nodes may be connected to the blockchain 106. It should be understood that the master transport node 102 may include additional components and that some of the components described herein may be removed and/or modified without departing from a scope of the master transport node 102 disclosed herein. The master transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the master transport node 102 may include multiple processors, multiple cores, or the like, without departing from the scope of the master transport node 102.

The master transport node 102 may also include a non-transitory computer readable medium 112' that may have stored thereon machine-readable instructions executable by the processor 104. Examples of the machine-readable instructions are shown as 113-117 and are further discussed below. Examples of the non-transitory computer readable medium 112' may include an electronic, magnetic, optical, or other physical storage device that contains or stores executable instructions. For example, the non-transitory computer readable medium 112' may be a Random Access memory (RAM), an Electrically Erasable Programmable Read-Only Memory (EEPROM), a hard disk, an optical disc, or other type of storage device.

The processor 104 may execute the machine-readable instructions 112' to send a first portion of a software update to a transport of a first subset of transports 113. The blockchain 106 may be configured to use one or more smart contracts that manage transactions for multiple participating nodes (e.g., 105 and 107). The master transport node 102 may provide software update-related information to the blockchain 106 and this transaction may be stored on the ledger 108.

The processor 104 may execute the machine-readable instructions 115 to send a second portion of the software update to a transport of a further subset of transports (e.g., 107). The processor 104 may execute the machine-readable instructions 117 to, when a first transport of the subset of the transports 105 and a second transport of the further subset of the transports 107 are in proximity: cause the first transport to send the first portion of the software update to the second transport, and cause the second transport 107 to send the second portion of the software update to the first transport 105.

Figure 1D:
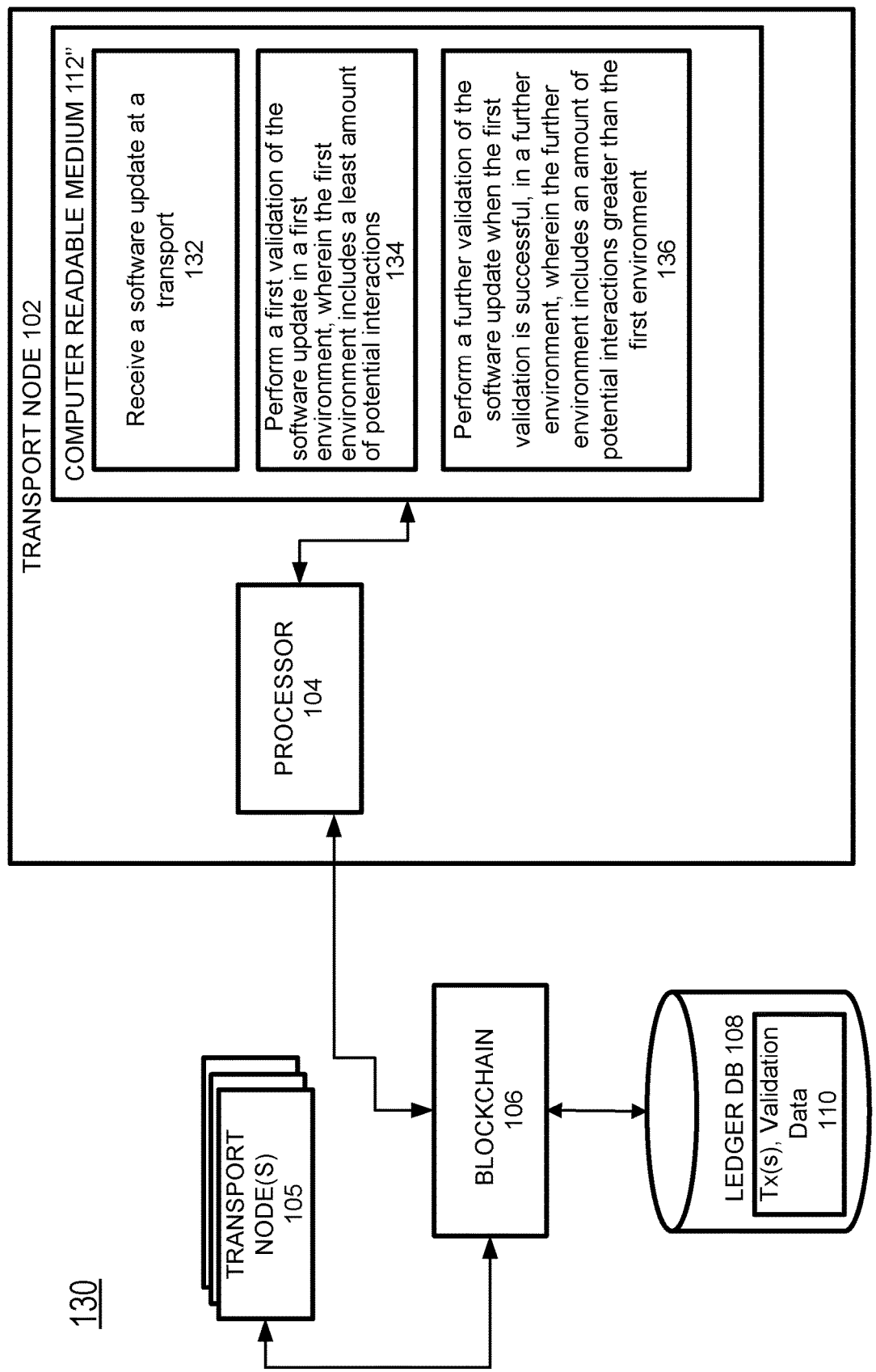
FIG. 1D illustrates another example network diagram including a transport node, according to example embodiments.

FIG. 1D illustrates a network diagram for management of transport software update. Referring to FIG. 1D, the network diagram 130 includes a transport node 102 (e.g., a vehicle) connected to other transport nodes 105 over a blockchain network 106 that has a ledger 108 for storing software validation data and transactions 110. The transport nodes 102 and 105 may also serve as blockchain 106 peers. While this example describes in detail only one transport node 102, multiple such nodes may be connected to the blockchain 106. It should be understood that transport node 102 may include additional components and that some of the components described herein may be removed and/or modified without departing from a scope of transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 112" that may have stored thereon machine-readable instructions executable by the processor 104. Examples of the machine-readable instructions are shown as 132-136 and are further discussed below. Examples of the non-transitory computer readable medium 112" may include an electronic, magnetic, optical, or other physical storage device that contains or stores executable instructions. For example, the non-transitory computer readable medium 112" may be a Random Access memory (RAM), an Electrically Erasable Programmable Read-Only Memory (EEPROM), a hard disk, an optical disc, or other type of storage device.

The processor 104 may execute the machine-readable instructions 132 to receive a software update at a transport 102. The blockchain 106 may be configured to use one or more smart contracts that manage transactions for multiple participating transport nodes 105. The transport 102 may provide software update-related validation information to the blockchain 106 and this transaction may be stored on the ledger 108.

The processor 104 may execute the machine-readable instructions 134 to perform a first validation of the software update in a first environment, wherein the first environment includes a least amount of potential interactions. The processor 104 may execute the machine-readable instructions 136 to perform a further validation of the software update when the first validation is successful, in a further environment. The further environment may include an amount of potential interactions greater than the first environment.

Figure 2A:
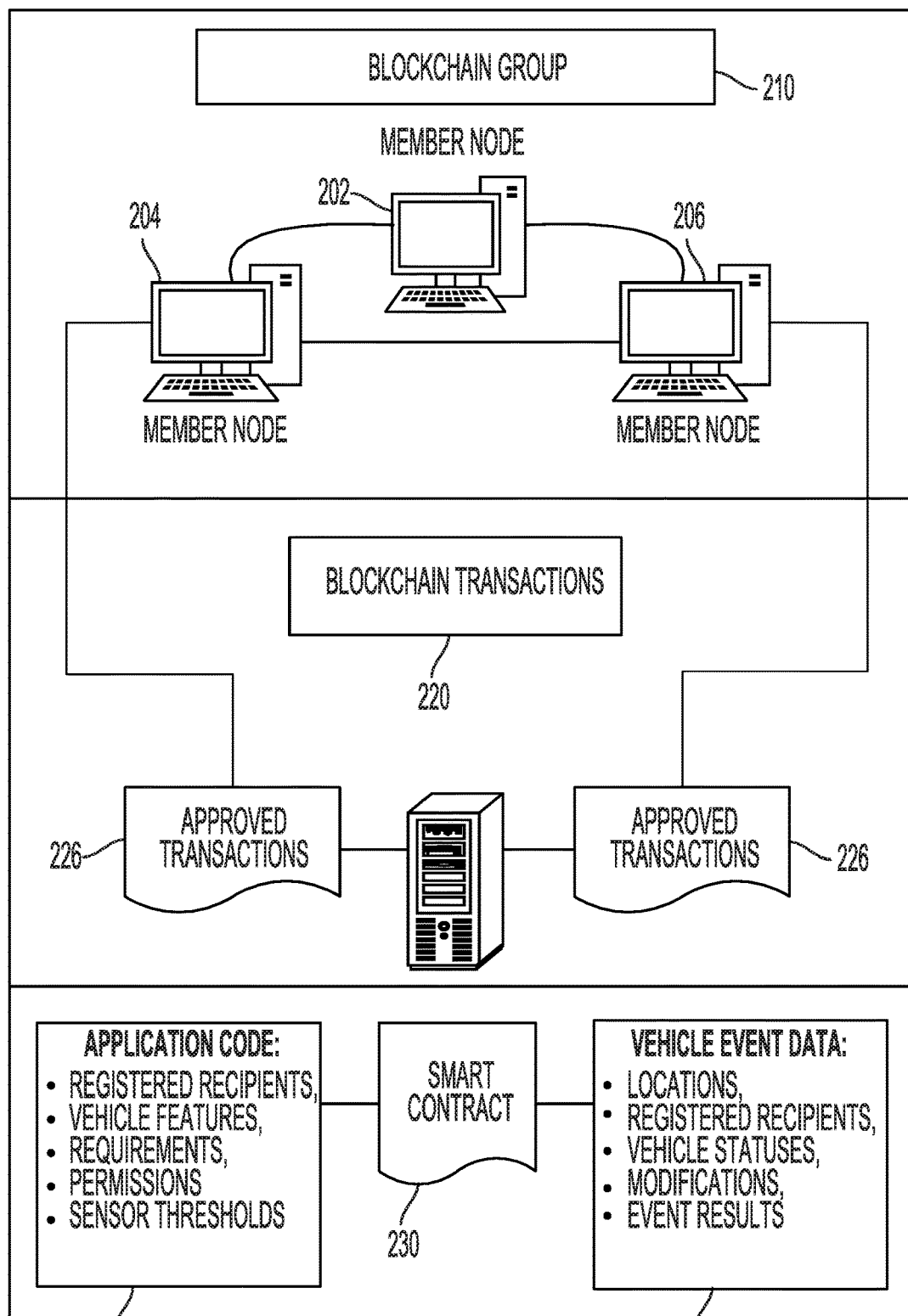
FIG. 2A illustrates a blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure, which includes performing a hash of the data contents of the transactions in a current block and referencing a previous hash of a previous block. Within the blockchain, one or more smart contracts 230 may exist that define the terms of transaction agreements and actions included in smart contract executable application code 232, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time. Then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 234, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 230, which are then stored in a blockchain. For example, sensor thresholds stored in the smart contract can be used as the basis for whether a detected service is necessary and when and where the service should be performed.

Figure 2B:
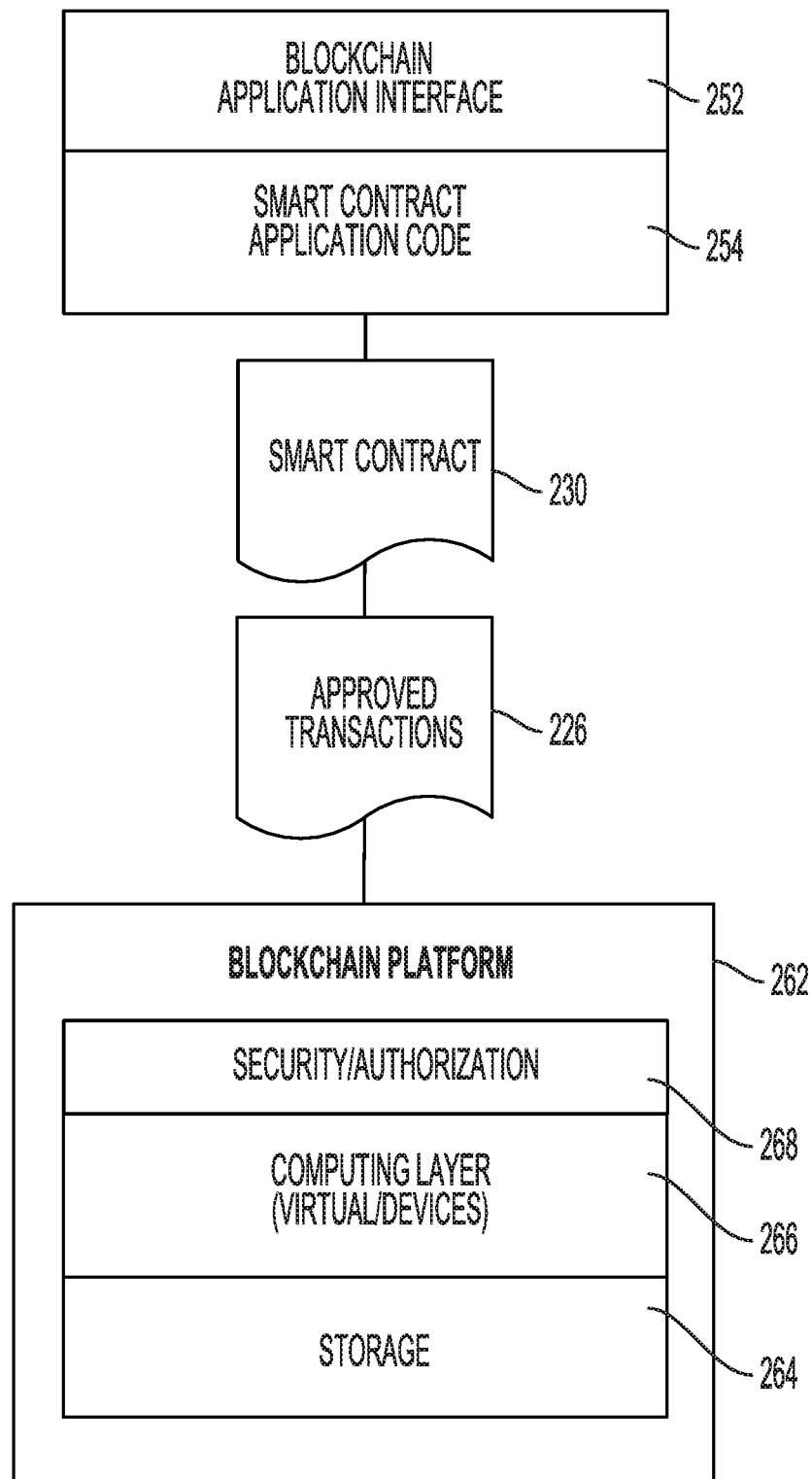
FIG. 2B illustrates another blockchain configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices, which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code, which is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 2C:
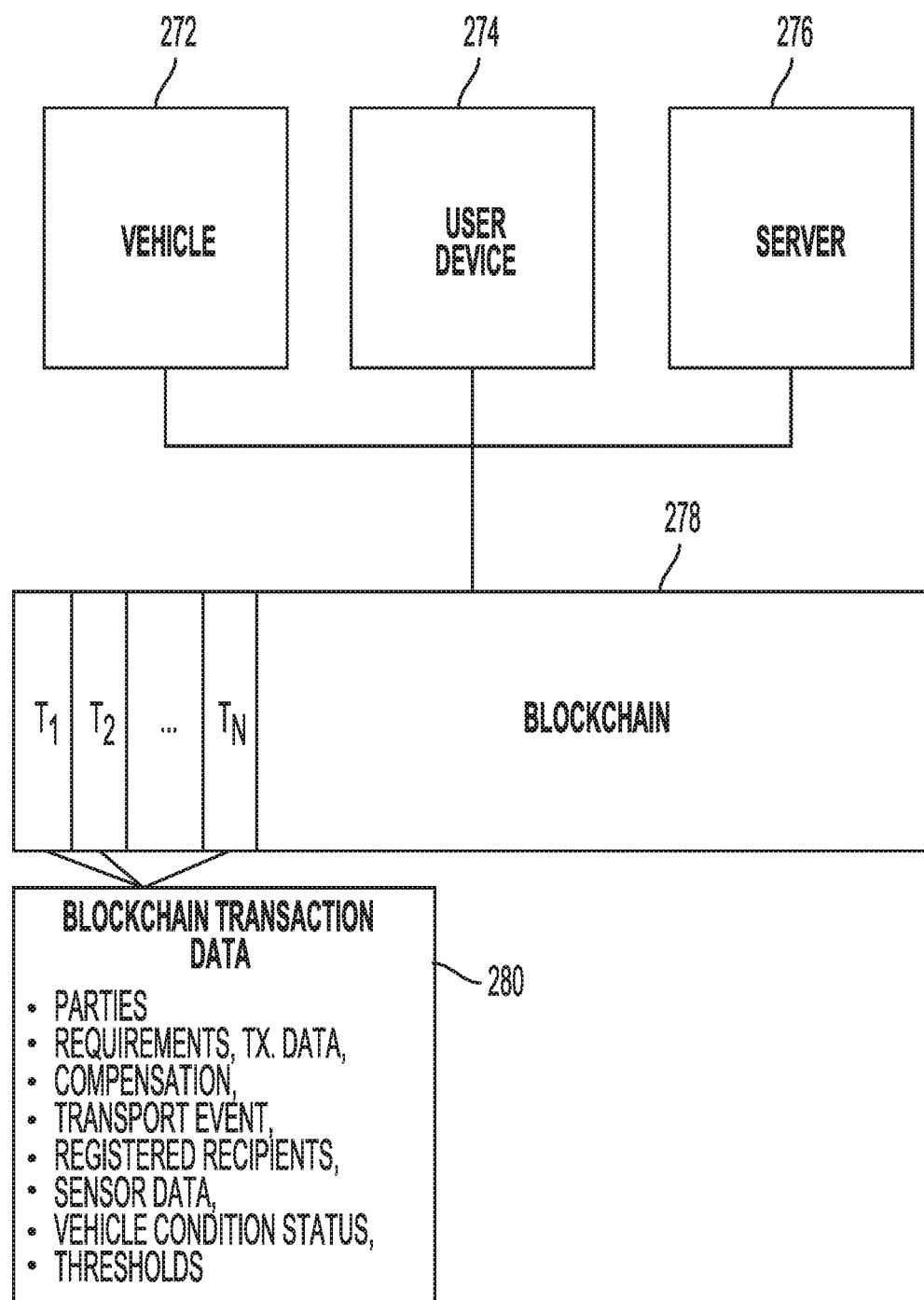
FIG. 2C illustrates a blockchain configuration for storing blockchain transaction data, according to example embodiments.

FIG. 2C illustrates a blockchain configuration for storing blockchain transaction data, according to example embodiments. Referring to FIG. 2C, the example configuration 270 provides for the vehicle 272, the user device 274 and a server 276 sharing information with a distributed ledger (i.e., blockchain) 278. The server may represent a service provider entity inquiring with a vehicle service provider to share user profile rating information in the event that a known and established user profile is attempting to rent a vehicle with an established rated profile. The server 276 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 280 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 3A:
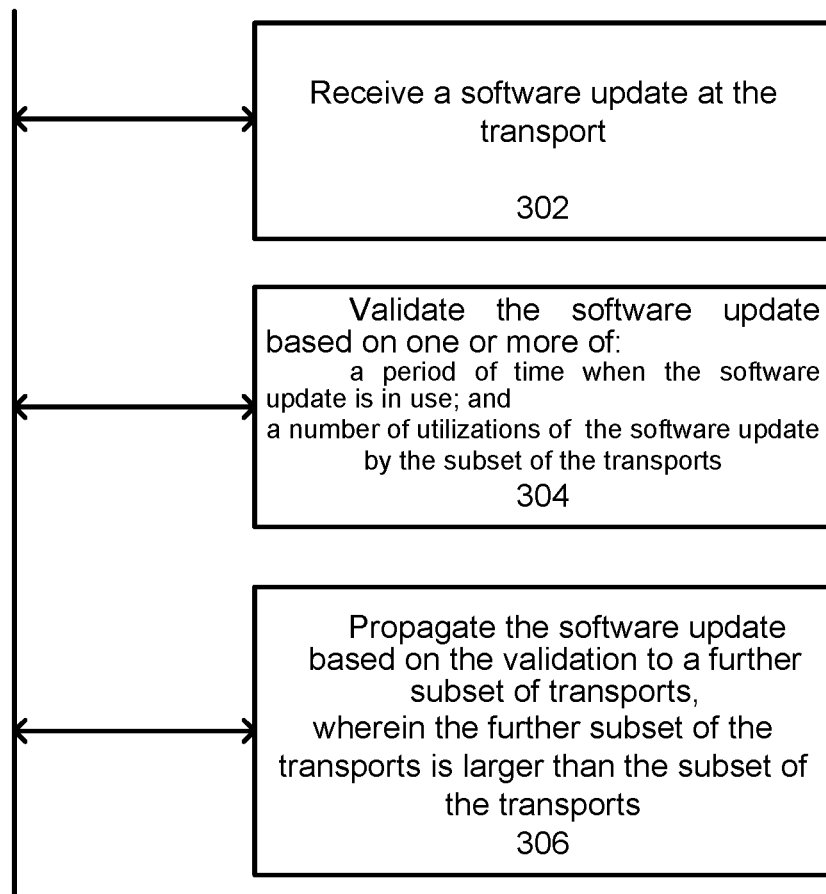
FIG. 3A illustrates a flow diagram, according to example embodiments.

FIG. 3A illustrates a flow diagram 300, according to example embodiments.

Referring to FIG. 3A, an example method may be executed by the transport node 102 (see FIG. 1B). It should be understood that method 300 depicted in FIG. 3A may include additional operations and that some of the operations described therein may be removed and/or modified without departing from the scope of the method 300. The description of the method 300 is also made with reference to the features depicted in FIG. 1B for purposes of illustration. Particularly, the processor 104 of the transport node 102 may execute some or all of the operations included in the method 300.

With reference to FIG. 3A, at block 302, the processor 104 may receive a software update at the transport. At block 304, the processor 104 may validate the software update based on one or more of: a period of time when the software update is in use and a number of utilizations of the software update by the subset of the transports. At block 306, the processor 104 may propagate the software update based on the validation to a further subset of transports. The further subset of the transports may be larger than the subset of the transports.

Figure 3B:
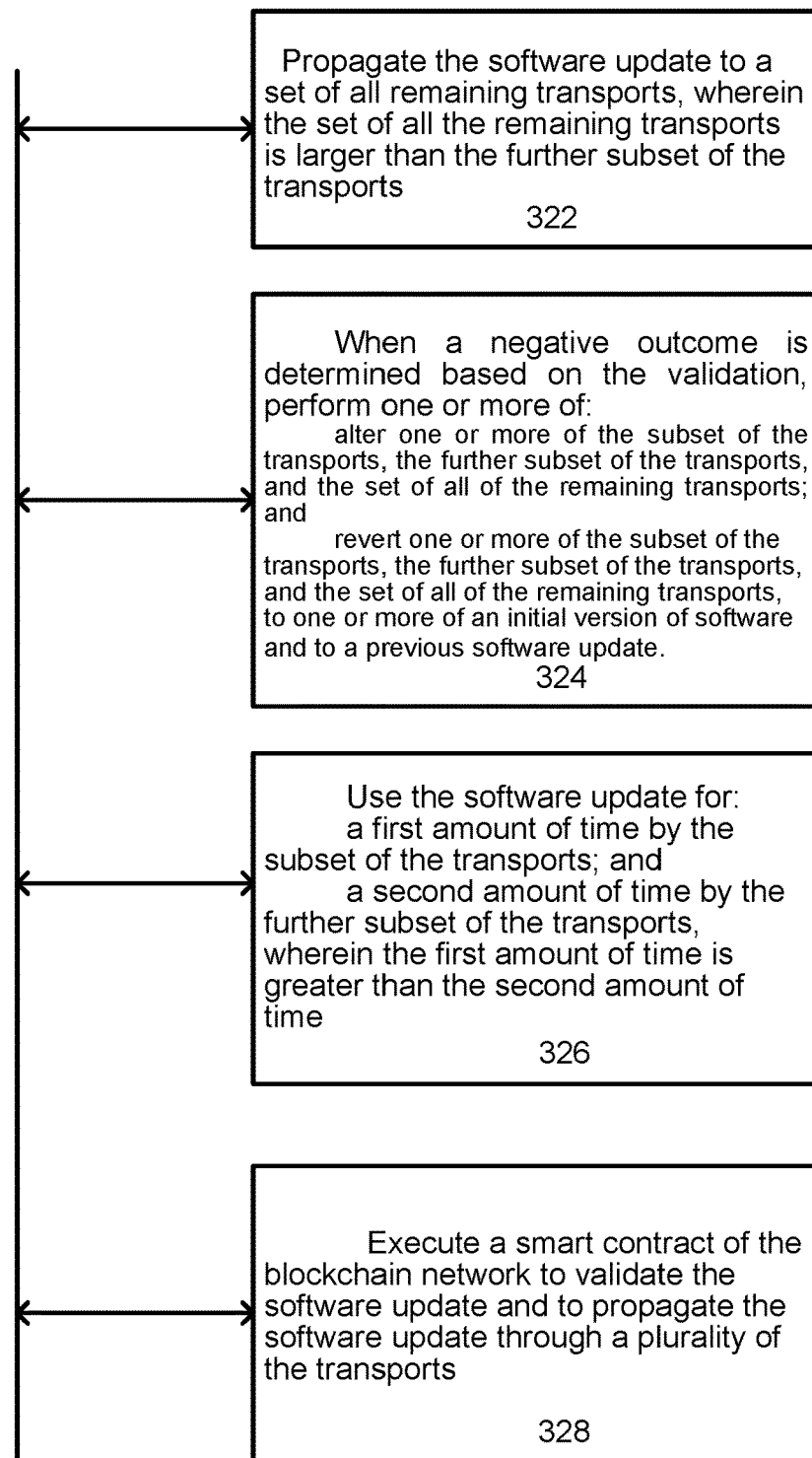
FIG. 3B illustrates another flow diagram, according to example embodiments.

FIG. 3B illustrates a flow diagram 320 of an example method, according to example embodiments. Referring to FIG. 3B, the method 320 may also include one or more of the following steps. At block 322, the processor 104 may propagate the software update to a set of all remaining transports, wherein the set of all the remaining transports is larger than the further subset of the transports. The subset of the transports, the further subset of the transports, and the set of all the remaining transports are based on one or more of: existing software, existing hardware, a geographic location, a temperature of an environment, a transport make, a transport model, a transport condition, a road condition, and a transport destination.

At block 324, the processor 104 may, when a negative outcome is determined based on the validation, perform one or more of: alter one or more of the subset of the transports, the further subset of the transports, and the set of all of the remaining transports, and revert one or more of the subset of the transports, the further subset of the transports, and the set of all of the remaining transports, to one or more of an initial version of software and to a previous software update. At block 326, the processor 104 may use the software update for: a first amount of time by the subset of the transports, and a second amount of time by the further subset of the transports, wherein the first amount of time is greater than the second amount of time. The subset of the transports may belong to a blockchain network. At block 328, the processor 104 may execute a smart contract of the blockchain network to validate the software update and to propagate the software update through a plurality of the transports.

Figure 3C:
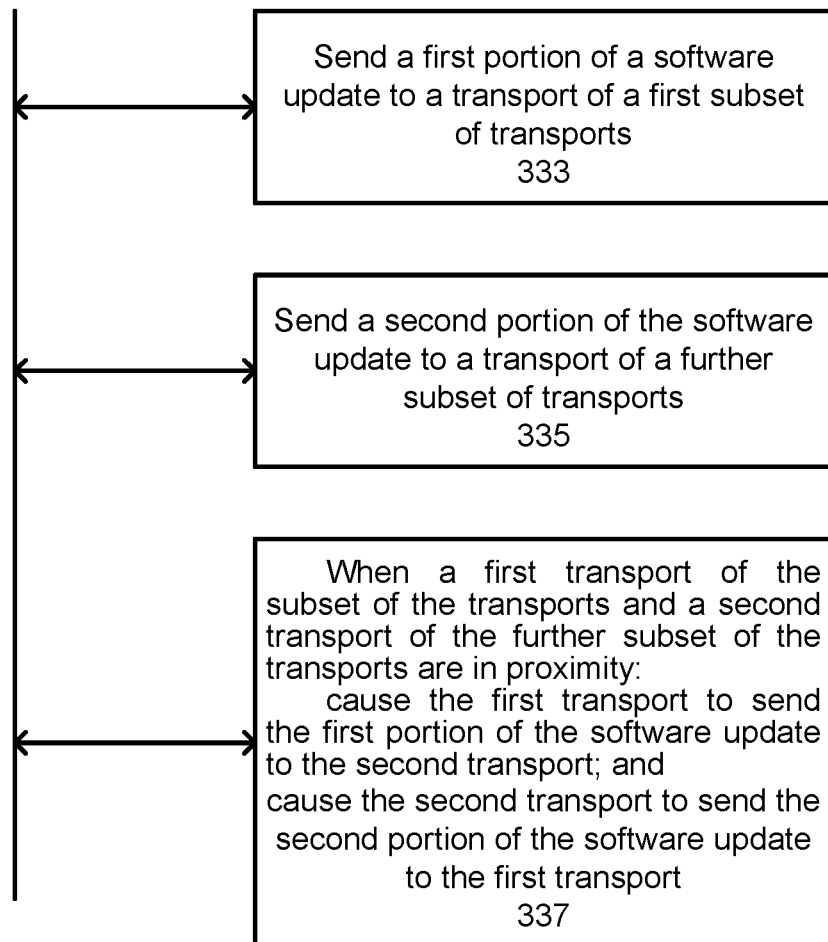
FIG. 3C illustrates a further flow diagram, according to example embodiments.

FIG. 3C illustrates a flow diagram 330, according to example embodiments. Referring to FIG. 3C, an example method may be executed by the master transport node 102 (see FIG. 1C). It should be understood that method 330 depicted in FIG. 3C may include additional operations and that some of the operations described therein may be removed and/or modified without departing from the scope of the method 330. The description of the method 330 is also made with reference to the features depicted in FIG. 1C for purposes of illustration. Particularly, the processor 104 of the master transport node 102 may execute some or all of the operations included in the method 330.

With reference to FIG. 3C, at block 333, the processor 104 may send a first portion of a software update to a transport of a first subset of transports. At block 335, the processor 104 may send a second portion of the software update to a transport of a further subset of transports. At block 337, the processor 104 may, when a first transport of the subset of the transports and a second transport of the further subset of the transports are in proximity, cause the first transport to send the first portion of the software update to the second transport, and cause the second transport to send the second portion of the software update to the first transport.

Figure 3D:
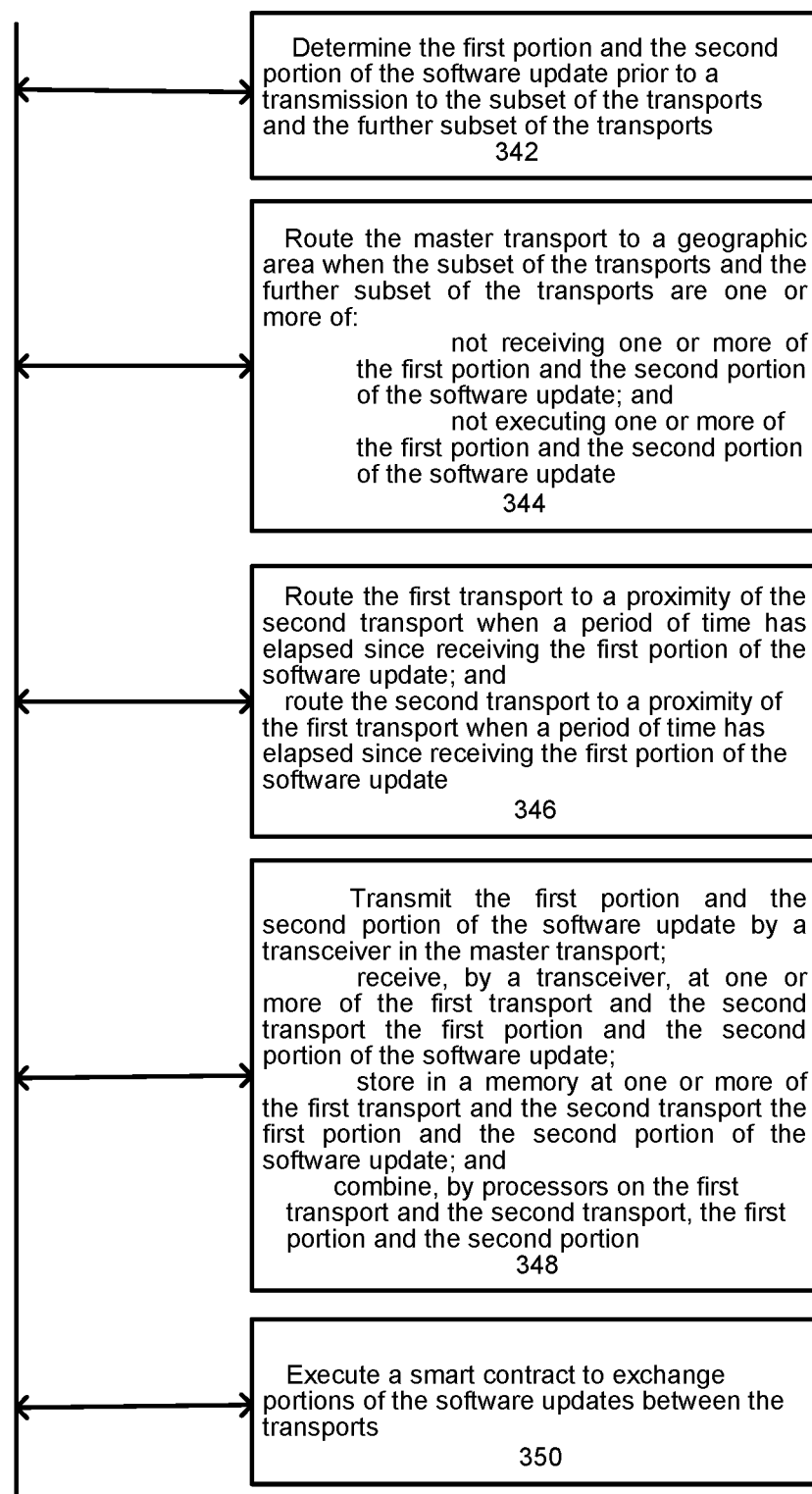
FIG. 3D illustrates yet a further flow diagram, according to example embodiments.

FIG. 3D illustrates a flow diagram 340 of an example method, according to example embodiments. Referring to FIG. 3D, the method 340 may also include one or more of the following steps. At block 342, the processor 104 may determine the first portion and the second portion of the software update prior to a transmission to the subset of the transports and the further subset of the transports. At block 344, the processor 104 may route the master transport to a geographic area when the subset of the transports and the further subset of the transports are not receiving one or more of the first portion and the second portion of the software update, and are not executing one or more of the first portion and the second portion of the software update.

At block 346, the processor 104 may route the first transport to a proximity of the second transport when a period of time has elapsed since receiving the first portion of the software update and may route the second transport to a proximity of the first transport when a period of time has elapsed since receiving the first portion of the software update. At block 348, the processor 104 may transmit the first portion and the second portion of the software update by a transceiver in the master transport, may receive, by a transceiver, at one or more of the first transport and the second transport the first portion and the second portion of the software update, may store in a memory at one or more of the first transport and the second transport the first portion and the second portion of the software update, and may combine, by processors on the first transport and the second transport, the first portion and the second portion.

Note that the master transport, the subset of the transports and the further subset of the transports may be connected over a blockchain network. At block 350, the processor 104 may execute a smart contract to exchange portions of the software updates between the transports.

FIG. 3E illustrates a flow diagram 360, according to example embodiments. Referring to FIG. 3E, an example method may be executed by the transport node 102 (see FIG. 1D). It should be understood that method 360 depicted in FIG. 3E may include additional operations and that some of the operations described therein may be removed and/or modified without departing from the scope of the method 360. The description of the method 360 is also made with reference to the features depicted in FIG. 1D for purposes of illustration. Particularly, the processor 104 of the transport node 102 may execute some or all of the operations included in the method 360.

With reference to FIG. 3E, at block 362, the processor 104 may receive a software update at a transport. At block 364, the processor 104 may perform a first validation of the software update in a first environment, wherein the first environment includes a least amount of potential interactions. At block 366, the processor 104 may perform a further validation of the software update when the first validation is successful, in a further environment. The further environment may include an amount of potential interactions greater than the first environment.

Figure 3F:
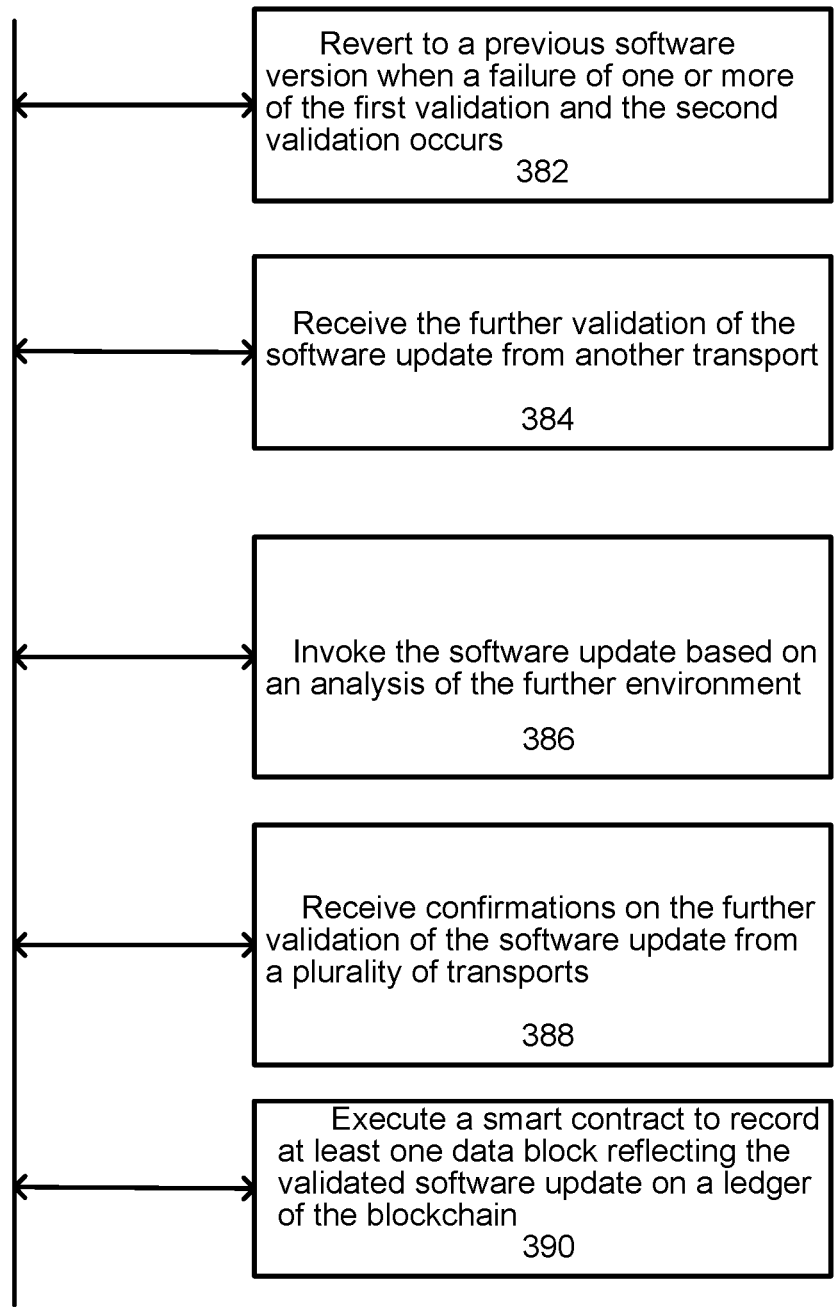
FIG. 3F illustrates yet a further flow diagram, according to example embodiments.

FIG. 3F illustrates a flow diagram 380 of an example method, according to example embodiments. Referring to FIG. 3F, the method 380 may also include one or more of the following steps. At block 382, the processor 104 may revert to a previous software version when a failure of one or more of the first validation and the second validation occurs. At block 384, the processor 104 may receive the further validation of the software update from another transport. At block 386, the processor 104 may invoke the software update based on an analysis of the further environment. At block 388, the processor 104 may receive confirmations on the further validation of the software update from a plurality of transports. The confirmations may constitute a consensus on a blockchain the transports belong to. At block 390, the processor 104 may execute a smart contract to record at least one data block reflecting the validated software update on a ledger of the blockchain.

Figure 4A:
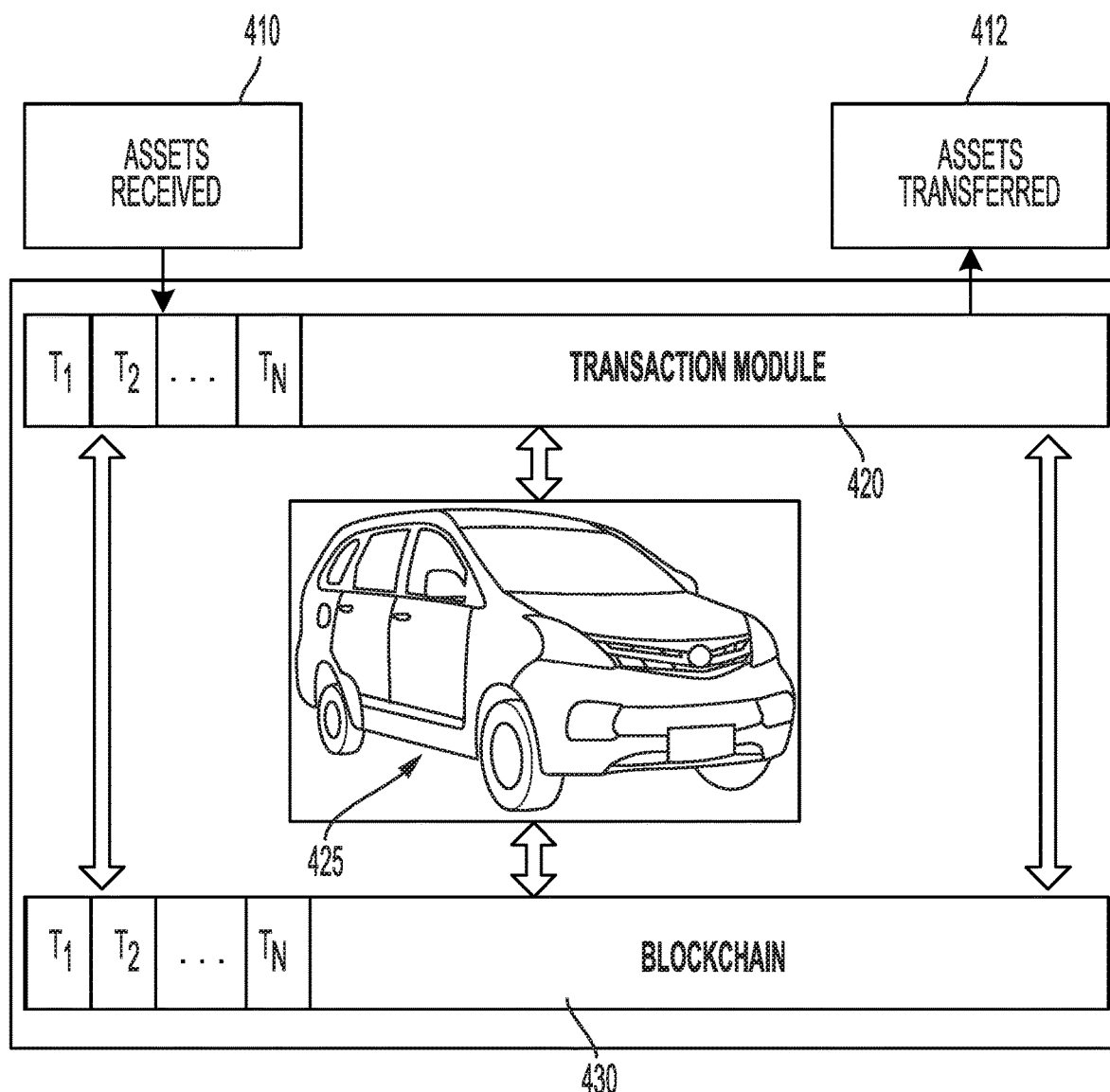
FIG. 4A illustrates an example blockchain vehicle configuration for managing blockchain transactions associated with a vehicle, according to example embodiments.

FIG. 4A illustrates an example blockchain vehicle configuration 400 for managing blockchain transactions associated with a vehicle, according to example embodiments. Referring to FIG. 4A, as a particular transport/vehicle 425 is engaged in transactions, such as asset transfer transactions (e.g., access key exchanges, vehicle service, dealer transactions, delivery/pickup, transportation services, etc.). The vehicle 425 may receive assets 410 and/or expel/transfer assets 412 according to a transaction(s) defined by smart contracts. The transaction module 420 may record information, such as parties, credits, service descriptions, date, time, location, results, notifications, unexpected events, etc. Those transactions in the transaction module 420 may be replicated into a blockchain 430, which may be managed by a remote server and/or by a remote blockchain peers, among which the vehicle 425 itself may represent a blockchain member and/or blockchain peer. In other embodiments, the blockchain 430 resides on the vehicle 425. The assets received and/or transferred can be based on location and consensus as described herein.

Figure 4B:
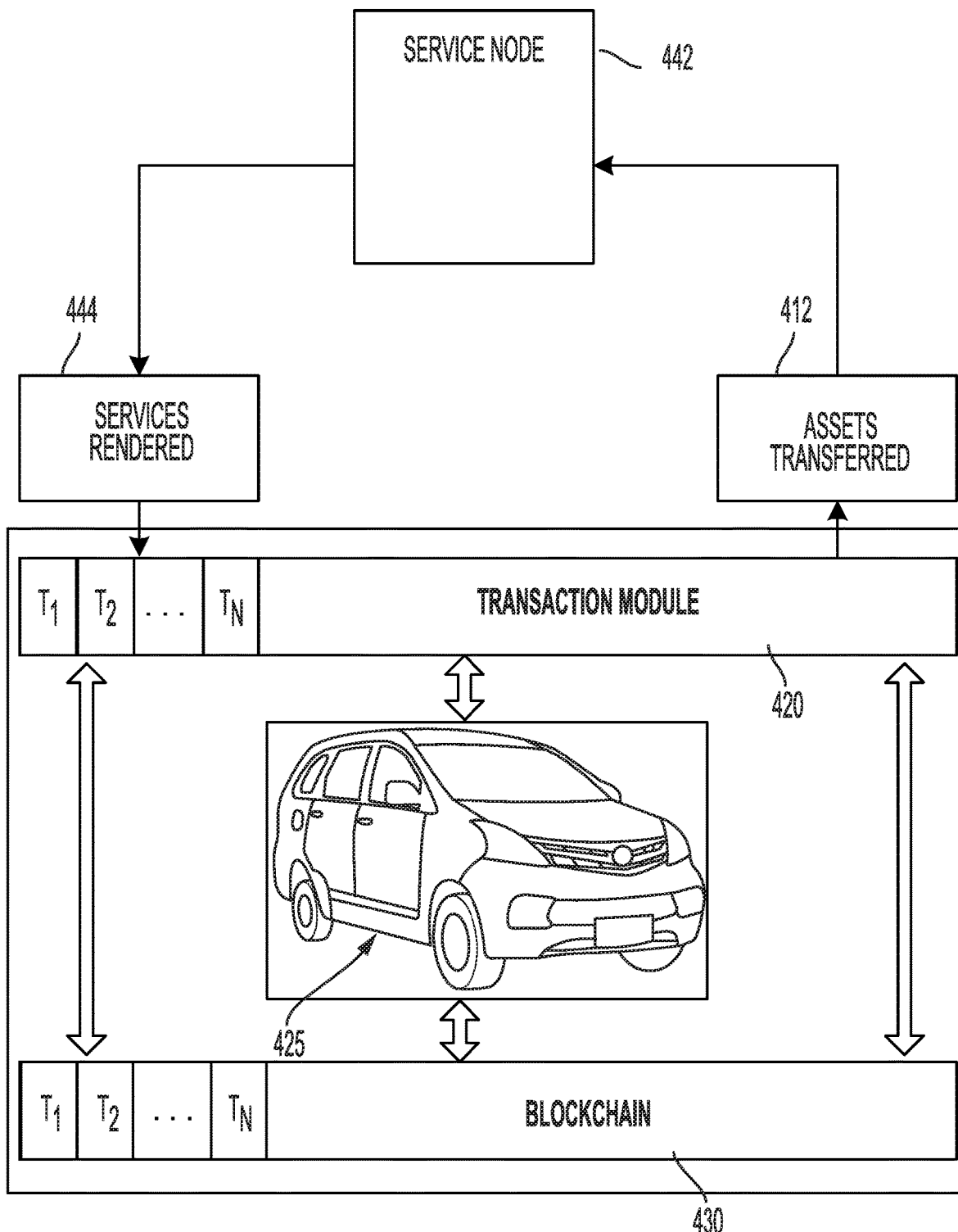
FIG. 4B illustrates another example blockchain vehicle configuration for managing blockchain transactions between a service center and a vehicle, according to example embodiments.

FIG. 4B illustrates an example blockchain vehicle configuration 440 for managing blockchain transactions between a service node (e.g., a gas station, a service center, a body shop, a rental center, automotive dealer, local service stop, delivery pickup center, etc.) and a vehicle, according to example embodiments. In this example, the vehicle 425 may have driven itself to a service node 442, because the vehicle needs service and/or needs to stop at a particular location. The service node 442 may perform a service (e.g., pimp gas) or may register the vehicle 425 for a service call at a particular time, with a particular strategy, such as oil change, battery charge or replacement, tire change or replacement, and any other transport related service. The services rendered 444 may be performed based on a smart contract, which is downloaded from or accessed via the blockchain 430 and identified for permission to perform such services for a particular rate of exchange. The services may be logged in the transaction log of the transaction module 420, the credits 412 are transferred to the service center 442 and the blockchain may log transactions to represent all the information regarding the recent service. In other embodiments, the blockchain 430 resides on the vehicle 425 and/or the service center server. In one example, a transport event may require a refuel or other vehicle service and the occupants may then be responsible for the asset value increase for such service. The service may be rendered via a blockchain notification, which is then used to redistribute the asset value to the occupants via their respective asset values. Responsibility for the service center activities can be based on asset transfer as described herein.

Figure 4C:
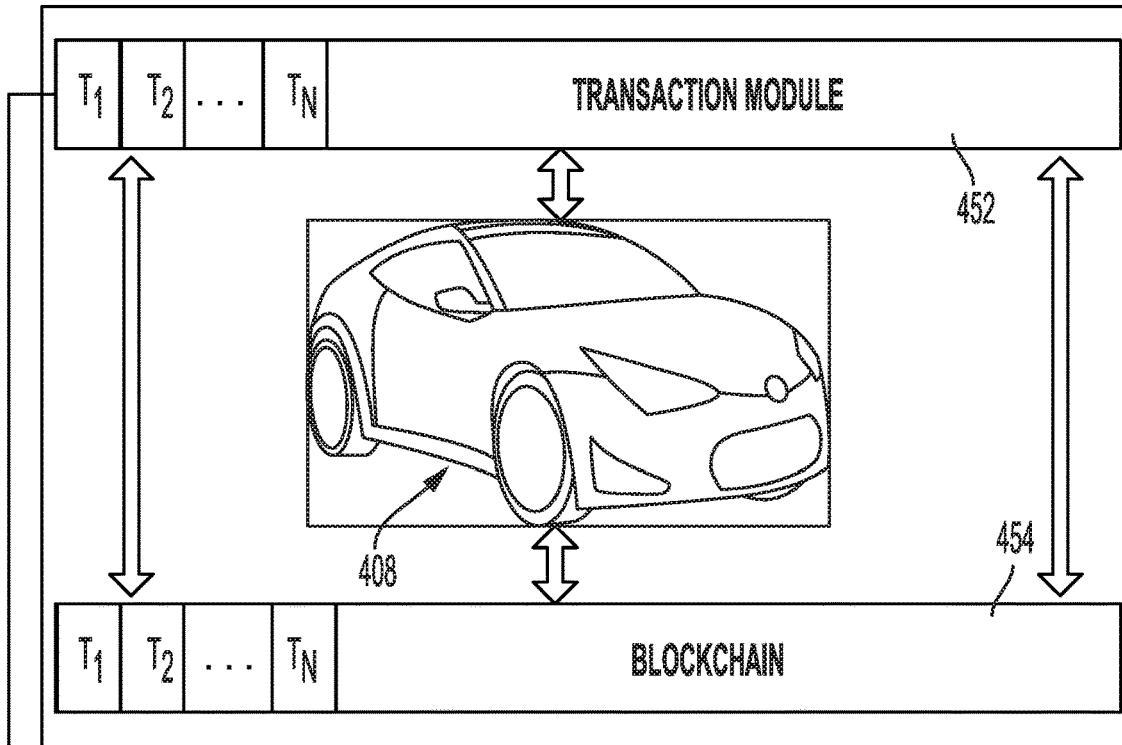
FIG. 4C illustrates yet another example blockchain vehicle configuration for managing blockchain transactions conducted among various vehicles, according to example embodiments
Figure 4C:
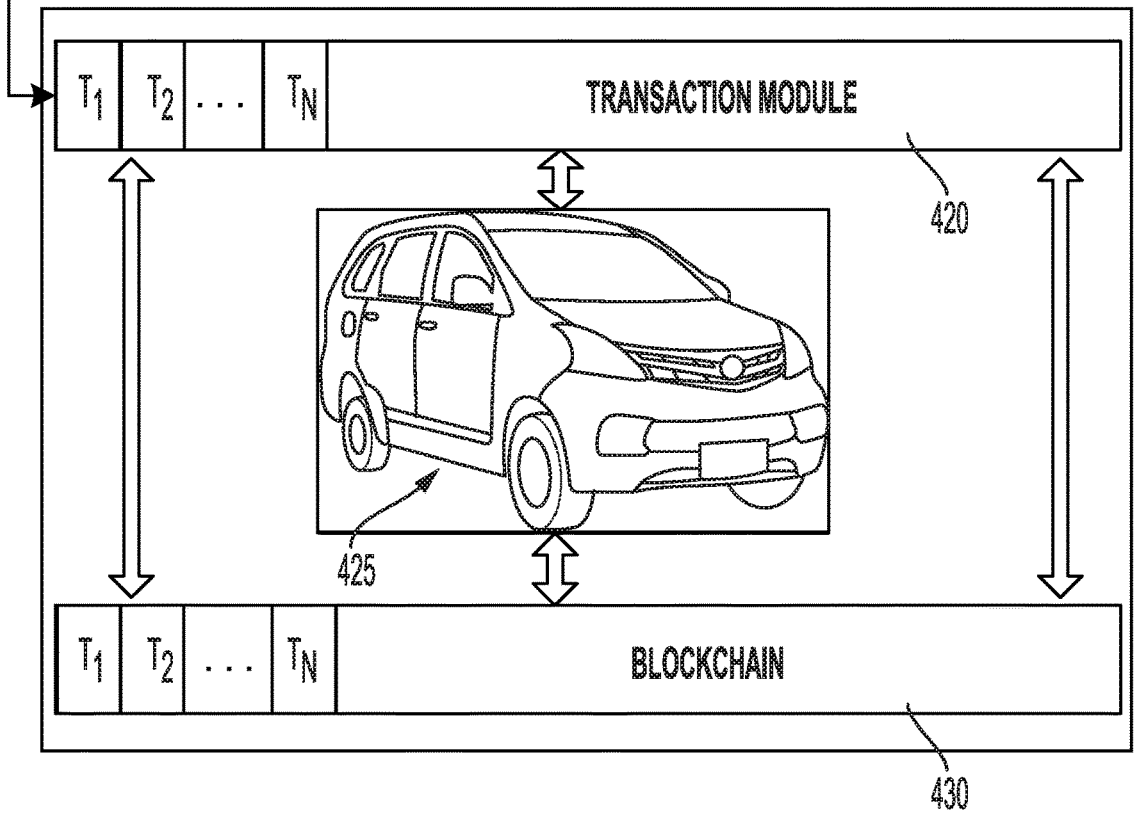

FIG. 4C illustrates an example blockchain vehicle configuration 450 for managing blockchain transactions conducted among various vehicles, according to the exemplary embodiments. The vehicle 425 may engage with another vehicle 408 to perform various actions such as to share access keys, transfer keys, acquire service calls, etc. when the vehicle has reached a status where the assets need to be shared with another vehicle. For example, the vehicle 408 may be due for a battery charge and/or may have an issue with a tire and may be in route to pick up a package for delivery. The vehicle 408 may notify another vehicle 425 which is in its network and which operates on its blockchain member service. The vehicle 425 may then receive the information via a wireless communication request to perform the package pickup from the vehicle 408 and/or from a server (not shown). The transactions are logged in the transaction modules 452 and 420 of both vehicles. The assets are transferred from vehicle 408 to vehicle 425 and the record of the asset transfer is logged in the blockchain 430/454 assuming that the blockchains are different from one another, or, are logged in the same blockchain used by all members. Responsibility for the transferred assets can be based on asset values (e.g., access keys) as described herein.

Figure 5:
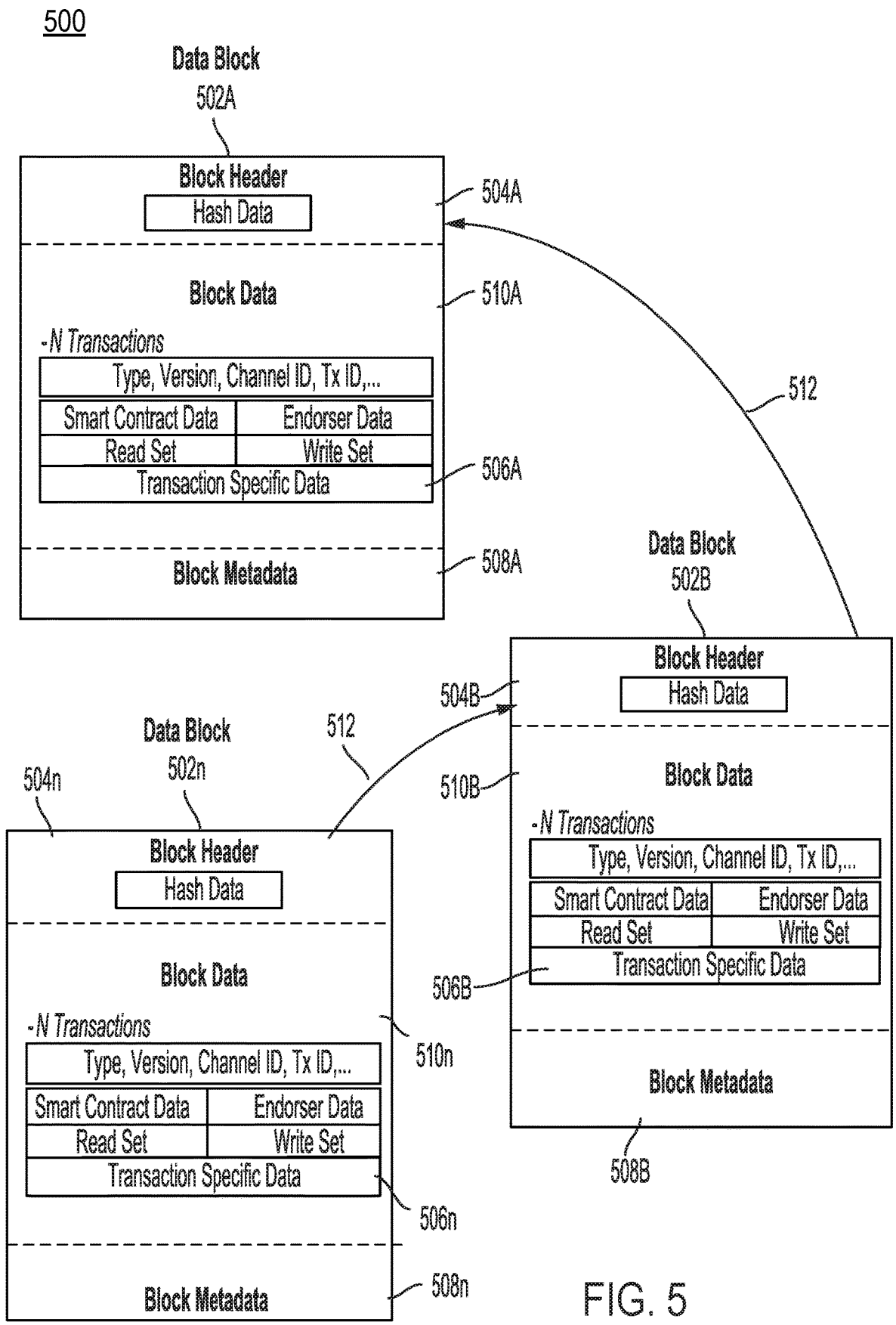
FIG. 5 illustrates example data blocks, according to example embodiments.

FIG. 5 illustrates blockchain blocks 500 that can be added to a distributed ledger, according to example embodiments, and contents of block structures 502A to 502*n*. Referring to FIG. 5, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 602A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a crypto-currency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5, a block 502A (also referred to as a data block) that is stored on the blockchain and/or the distributed ledger may include multiple data segments such as a block header 504A to 504n, transaction specific data 506A to 506n, and block metadata 508A to 508n. It should be appreciated that the various depicted blocks and their contents, such as block 502A and its contents are merely for purposes of an example and are not meant to limit the scope of the example embodiments. In some cases, both the block header 504A and the block metadata 508A may be smaller than the transaction specific data 506A which stores entry data; however, this is not a requirement. The block 502A may store transactional information of N entries (e.g., 100, 500, 1000, 2000, 3000, etc.) within the block data 510A to 510n. The block 502A may also include a link to a previous block (e.g., on the blockchain) within the block header 504A. In particular, the block header 504A may include a hash of a previous block's header. The block header 504A may also include a unique block number, a hash of the block data 510A of the current block 502A, and the like. The block number of the block 502A may be unique and assigned in an incremental/sequential order starting from zero. The first block in the blockchain may be referred to as a genesis block which includes information about the blockchain, its members, the data stored therein, etc.

The block data 510A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 510A may also store transaction specific data 506A which adds additional information to the hash-linked chain of blocks in the blockchain. Accordingly, the data 506A can be stored in an immutable log of blocks on the distributed ledger. Some of the benefits of storing such data 506A are reflected in the various embodiments disclosed and depicted herein. The block metadata 508A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 502B to 502n in the blockchain also have headers, files, and values. However, unlike the first block 502A, each of the headers 504A to 504n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 512, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
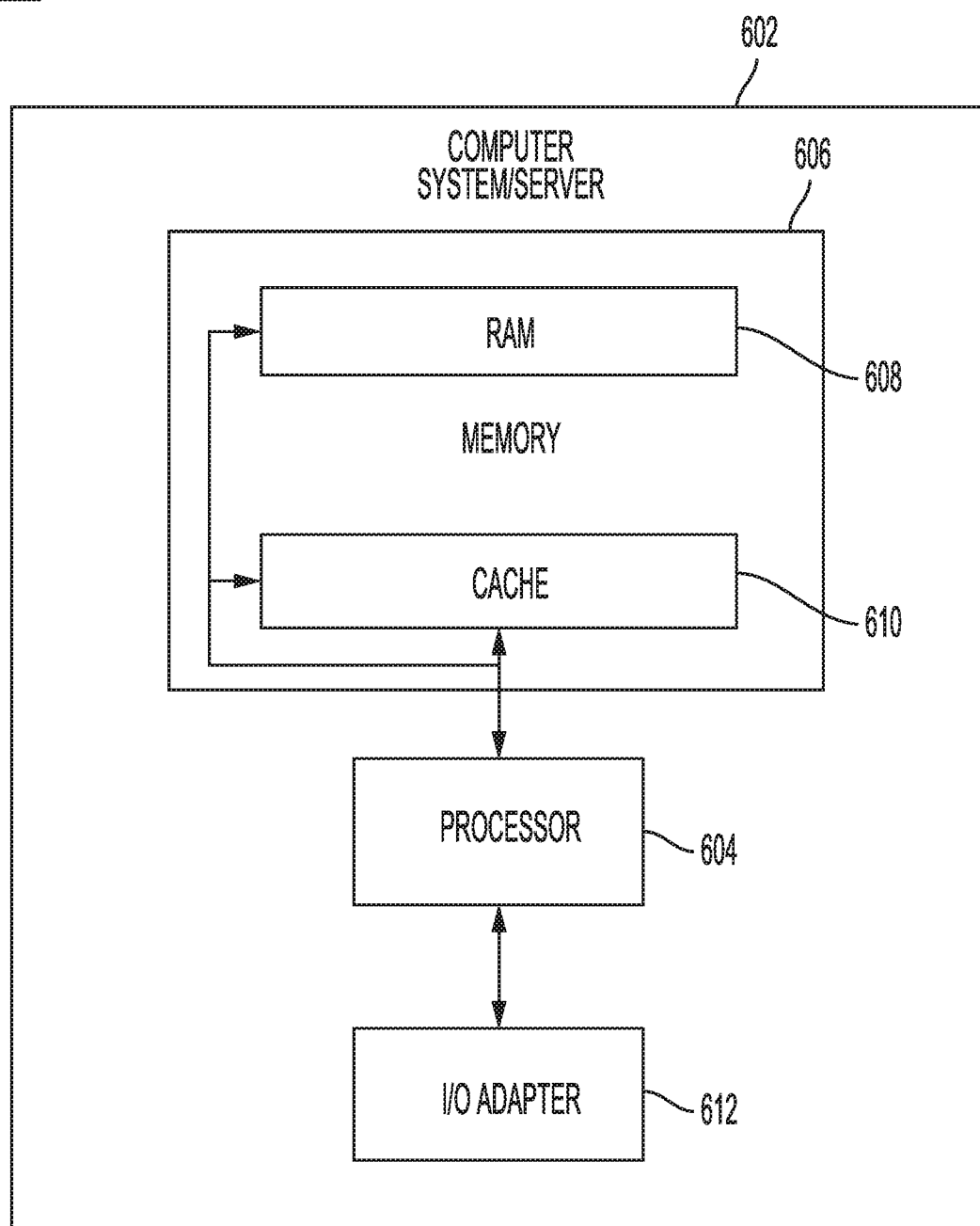
FIG. 6 illustrates an example system that supports one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices via an I/O adapter 612, such as a keyboard, a pointing device, a display, etc.; one or more devices that enable a user to interact with computer system/server 602; and/or any devices (e.g., network card, modem, etc.) that enable computer system/server 602 to communicate with one or more other computing devices. Such communication can occur via I/O interfaces of the adapter 612. Still yet, computer system/server 602 can communicate with one or more networks such as a local area network (LAN), a general wide area network (WAN), and/or a public network (e.g., the Internet) via a network adapter. As depicted, adapter 612 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    selecting a transport among a subset of transports to receive a software update based on one or more characteristics of the transport and a probable usage of the software update, wherein the characteristics of the transport comprise one or more of a security level of the transport, an age of the transport, hardware in the transport, a condition of the transport, and features included in the transport;
    providing the software update to the selected transport;
    receiving a software update issue report based on usage of the software update by the transport; and
    responsive to a validation of the software update issue report, propagating the software update, to a further subset of transports, wherein the further subset of the transports is larger than the subset of the transports.

2. The method of claim 1, further comprising propagating the software update, by the further subset of the transports, to a set of all remaining transports, wherein the set of all the remaining transports is larger than the further subset of the transports.

3. The method of claim 1, wherein one or more of the subset of transports, the further subset of the transports, and the set of all the remaining transports are based on one or more of:
    existing software;
    existing hardware;
    a geographic location;
    a temperature of an environment;
    a transport make;
    a transport model;
    a transport condition;
    a road condition; and
    a transport destination.

4. The method of claim 1, further comprising, when a negative outcome is determined, based on the validation, performing one or more of:
    alerting one or more of the subset of the transports, the further subset of the transports, and the set of all of the remaining transports; and
    reverting one or more of the subset of the transports, the further subset of the transports, and the set of all of the remaining transports, to one or more of an initial version of software and to a previous software update.

5. The method of claim 1, wherein the software update is utilized for:
    a first amount of time by the subset of the transports; and
    a second amount of time by the further subset of the transports, wherein the first amount of time is greater than the second amount of time.

6. The method of claim 1, wherein the subset of the transports belongs to a blockchain network.

7. The method of claim 6, comprising executing a smart contract of the blockchain network to validate the software update and to propagate the software update through a plurality of the transports.

8. A system, comprising:
    a processor of a master transport;
    a memory on which are stored machine readable instructions that when executed by the processor, cause the processor to:
    select a transport among a subset of transports to receive one or more portions of a software update based on one or more characteristics of the transport and a probable usage of the software update, wherein the characteristics of the transport comprise one or more of a security level of the transport, an age of the transport, hardware in the transport, a condition of the transport, and features included in the transport;
provide the software update to the selected transport;
receive a software update issue report based on usage of the software update by the transport; and
responsive to a validation of the software update issue report, propagate the software update to a further subset of transports, wherein the further subset of the transports is larger than the subset of the transports.

9. The system of claim 8, wherein the instructions are further to cause the processor to propagate the software update to a set of all transports that remain, wherein the set of all the transports that remain is larger than the further subset of the transports.

10. The system of claim 8, wherein one or more of the subset of transports, the further subset of the transports, and the set of all the transports that remain are based on one or more of:
existing software;
existing hardware;
a geographic location;
a temperature of an environment;
a transport make;
a transport model;
a transport condition;
a road condition; and
a transport destination.

11. The system of claim 8, wherein the instructions are further to cause the processor to, when a negative outcome is determined based on the validation, perform one or more of:
alter one or more of the subset of the transports, the further subset of the transports, and the set of all of the transports that remain; and
revert one or more of the subset of the transports, the further subset of the transports, and the set of all of the transports that remain, to one or more of an initial version of software and to a previous software update.

12. The system of claim 8, wherein the instructions are further to cause the processor to use the software update for:
a first amount of time by the subset of the transports; and
a second amount of time by the further subset of the transports, wherein the first amount of time is greater than the second amount of time.

13. The system of claim 8, wherein the subset of the transports belongs to a blockchain network.

14. The system of claim 13, wherein the instructions are further to cause the processor to execute a smart contract of the blockchain network to validate the software update and to propagate the software update through a plurality of the transports.

15. A non-transitory computer readable medium comprising instructions, that when read by a processor, cause the processor to perform:
selecting a transport among a subset of transports to receive one or more portions of a software update based on one or more characteristics of the transport and a probable usage of the software update, wherein the characteristics of the transport comprise one or more of a security level of the transport, an age of the transport, hardware in the transport, a condition of the transport, and features included in the transport;
providing the one or more portions of the software update to the selected transport;
receiving a software update issue report based on usage of the software update by the transport; and
responsive to a validation of the software update issue report, propagating the software update, to a further subset of transports, wherein the further subset of the transports is larger than the subset of the transports.

16. The non-transitory computer readable medium of claim 15, further comprising instructions, that when read by a processor, cause the processor to propagate the software update to a set of all remaining transports, wherein the set of all the remaining transports is larger than the further subset of the transports.

17. The non-transitory computer readable medium of claim 15, further comprising instructions, that when read by a processor, cause the processor to, when a negative outcome is determined based on the validation, perform one or more of:
alter one or more of the subset of the transports, the further subset of the transports, and the set of all of the remaining transports; and
revert one or more of the subset of the transports, the further subset of the transports, and the set of all of the remaining transports, to one or more of an initial version of software and to a previous software update.

18. The non-transitory computer readable medium of claim 15, further comprising instructions, that when read by a processor, cause the processor to use the one or more portions of the software update for:
a first amount of time by the subset of the transports; and
a second amount of time by the further subset of the transports, wherein the first amount of time is greater than the second amount of time.

19. The non-transitory computer readable medium of claim 15, wherein the subset of the transports is connected over a blockchain network.

20. The non-transitory computer readable medium of claim 19, further comprising instructions, that when read by a processor, cause the processor to execute a smart contract of the blockchain network to validate the software update and to propagate the software update through a plurality of the transports.

* * * * *